Sept. 19, 1950

A. E. COPPLEMAN 2,522,997

PHONOGRAPH PICKUP ARM

Filed Nov. 20, 1944

INVENTOR.
ARCHIE E. COPPLEMAN.

BY C. Lauren Maltby
ATTORNEY.

Patented Sept. 19, 1950 2,522,997

UNITED STATES PATENT OFFICE 2,522,997

PHONOGRAPH PICKUP ARM

Archie E. Coppleman, Los Angeles, Calif.

Application November 20, 1944, Serial No. 564,201

3 Claims. (Cl. 274—23)

This invention relates to phonographs and the like, and more especially to a pick-up arm construction for mounting a pick-up or reproducer whereby distortion may be substantially eliminated.

An object of the invention is to provide a simple, practical and an effective pick-up arm structure for phonographs of the character described.

Another object of the invention is to provide a novel phonograph pick-up arm construction whereby distortion of the reproduced sound is substantially eliminated.

Another object is to provide a pick-up arm structure for mounting a pick-up or reproducer whereby the pick-up is moved across the sound track or recorded area of a record along a true radial line thereof.

A further object is to provide a pick-up and arm construction whereby a pick-up mounted on a radially pivoted arm is caused to move across the sound track or a record along a true radial line thereof.

An additional object is to provide a pick-up and pivoted arm construction wherein the pick-up is moved along a radial line of a record and also maintained in fixed angular position with respect thereto.

Other objects and advantages will appear and be brought out more fully in the following specification, reference being had to the accompanying drawing wherein.

Figures 1, 2:
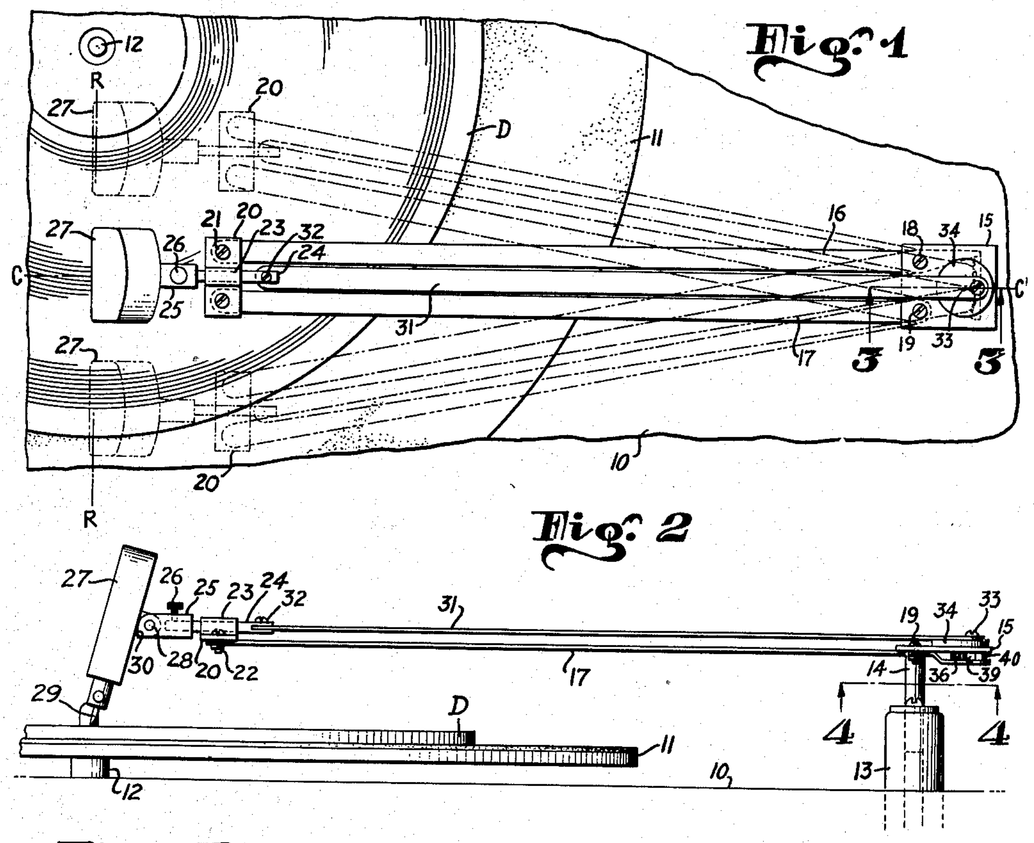
Fig. 1 is a top view of a portion of a phonograph showing my pick-up arm construction.
Fig. 2 is a side elevation view of the same.

Referring more particularly to the drawing I show a phonograph having a structural top or table 10 on which a turntable 11 is rotatably mounted as at 12, a disc record D being shown on turntable 11. A pedestal or similar element 13 is provided on table 10 and has a bore for a pedestal 14 which may be raised and lowered in the bore in conventional manner for the pick-up or tone arm when used with an automatic record changing type of phonograph, pedestal 14, however, being non-rotatable in any suitable manner. A plate member 15 is suitably fixed on the upper end of pedestal 14 and a pair of arms 16 and 17 are pivotally secured at one end thereof, as at 18 and 19, to base member 15.

A bracket 20 is pivotally secured as at 21 and 22 to the free ends of arms 16 and 17, respectively, and is provided with a channel portion 23 in which is suitably guided a reciprocable or oscillatable rod 24 which is, however, restrained against rotational movement in the channel portion 23. A sleeve member 25 is provided with a bore and a thumb screw 26 for removable attachment to the end of rod 24, and a reproducer or pick-up 27 is pivoted at 28 to sleeve member 25 and provided with a needle or stylus 29, sleeve member 25 having an abutment portion 30 to provide support for pick-up 27 in substantially the position shown in Fig. 2 when the pick-up arm structure is elevated by the raising of pedestal 14 to permit changing of records in automatic manner.

A link 31 is pivotally secured at 32 to the inner end of rod 24 and pivotally secured at its inner end at 33 to a pinion and gear member 34 which has a stud portion 35 providing a bearing connection with base member 15, a pinion 36 being rotatably mounted on stud 35. Arm 16 has an extension portion 37 to which at 38 a rack bar 39 is pivotally secured, the teeth of which are arranged for mesh engagement with the teeth of pinion 36, and a guide roller 40 is mounted on base member 15 to retain rack bar 39 in engagement with pinion 36, however, other equivalent rack bar guide means may be provided, if desired.

Figure 3:
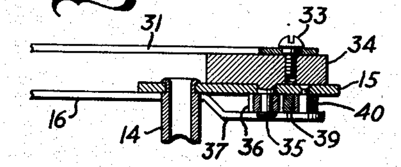
Fig. 3 is an enlarged partial sectional view taken along the line 3—3 of Fig. 1.
Figure 4:
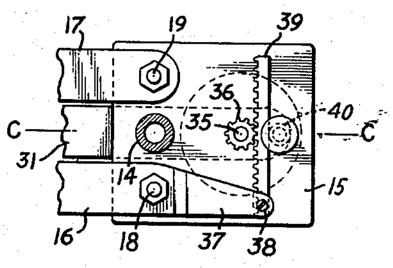
Fig. 4 is an enlarged fragmentary view, as seen from the line 4—4 of Fig. 2.

As can clearly be seen in Figs. 1, 3 and 4, when the pick-up arm structure is swung through an angle or arc by the movement of pick-up 27 across the sound track of a record, the swinging of arm 16 will be transmitted through extension 37 and rack 39 to pinion and gear member 34 which will move pivot 33 in an arc on either side of the center line *c—c*, shown in Figs. 1 and 4, thus shifting the right hand end of arm 31 to the left to move pivot point 32 along a line perpendicular to the said center line thus causing a similar movement of pick-up 27 along a perpendicular to said center line carrying the stylus 29 along a radius *r—r* of turntable 11 and the record disc D. Thus during such a movement bracket 20 will be swung away from pick-up 27, but is maintained in fixed angular position with respect to center line *c—c* and radius *r—r*, and pick-up 27 is likewise maintained in fixed angular position with respect thereto such that the horizontal projection of stylus 29 is parallel to or tangent to the recording grooves which intersect radius *r—r*, and there is therefore no distortion of the sound which otherwise occurs when the angular position of the pick-up changes in moving across the sound track area of a record when fixed to a conventional pick-up arm which moves angularly about a pivot and the pick-up is swung in an arc at the end of the pick-up arm.

Figure 5:
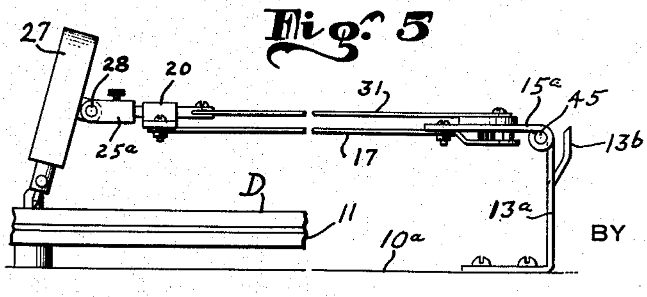
Fig. 5 is a side view, similar to Fig. 2, showing a modified form of the invention.

In Fig. 5 I show a modified form of mounting for the pick-up arm structure for use with a phonograph and not employing an automatic change-off feature. In this figure the phonograph is shown having a table 10*a* on which is secured a bracket element 13*a* having a horizontal pivot 45 for a plate member 15*a*. The pick-up arm structure, which includes arms 16, 17, link 31 and bracket 20, is substantially the same as shown in Figs. 1 to 4. A sleeve 25*a* pivotally supports a pick-up 27 pivoted thereto at 28, however, the abutment feature, indicated 30 in Figs. 1 to 4, is not necessary and is not provided in this modification. Bracket 13*a* has an abutment extension portion 13*b* whereby the pickup-arm may be swung vertically and rest on abutment portion 13*b* when it is desired to change records.

Having thus described my invention, what I claim and desire to secure by Letters Patent is:

1. In a phonograph having a turntable for a record having an annular recorded area and pick-up means, a pick-up arm structure for a pick-up comprising a relatively fixed base member, a pair of spaced arms pivoted at one end to said base member, a bracket pivotally connected to said arm structure at the free end thereof, a pick-up mounted on said bracket for movement toward and away from said bracket, and means to effect said movements and movement of said pick-up along a true radius of said turntable when said structure is swung on its pivot axis on said base member.

2. In a phonograph having a turntable for a record having an annular sound recorded area and pick-up means, a pick-up arm structure for a pick-up comprising a relatively fixed base member, a pair of spaced arms pivoted at one end to said base member, a bracket pivotally connected to said arm structure at the free end thereof, a pick-up mounted on said bracket for movement toward and away from said bracket and means to effect said movements and movement of said pick-up along a true radius of said turntable when said structure is swung on its pivot axis on said base member, said means including a pinion gear member on said base member, a rack on said arm structure and connetced to said pinion, and a link connecting said gear member and said pick-up.

3. In a phonograph having a turntable for a record having an annular sound recorded area and pick-up means, a pick-up arm structure for a pick-up comprising a relatively fixed base member, a pair of spaced arms pivoted at one end to said base member, a bracket pivotally connected to said arm structure at the free end thereof, a pick-up mounted on said bracket for movement toward and away from said bracket and means to effect said movements and movement of said pick-up along a true radius of said turntable when said structure is swung on its pivot axis on said base member, said means including a pinion gear member on said base member, a rack on said arm structure adapted to rotate said pinion gear member when said arm structure is swung, and a link connecting said pick-up and a point on said pinion gear member offset from the center thereof.

ARCHIE E. COPPLEMAN.

REFERENCES CITED

The following references are of record in the file of this patent:

UNITED STATES PATENTS

| Number | Name | Date |
|---|---|---|
| 1,349,636 | Swing | Aug. 17, 1920 |
| 1,438,642 | Graham | Dec. 12, 1922 |
| 1,933,400 | Victor | Oct. 31, 1933 |
| 1,963,673 | Patino | June 19, 1934 |
| 2,025,300 | Mueller | Dec. 24, 1935 |
| 2,303,619 | Davis | Dec. 1, 1942 |

FOREIGN PATENTS

| Number | Country | Date |
|---|---|---|
| 300,704 | Great Britain | Nov. 12, 1928 |
| 305,354 | Great Britain | Feb. 7, 1929 |
| 386,851 | Great Britain | Jan. 26, 1933 |
| 398,262 | Great Britain | Sept. 14, 1933 |
| 676,429 | France | Nov. 28, 1929 |